United States Patent [19]

Takahashi et al.

[11] 4,097,233

[45] Jun. 27, 1978

[54] BASIC DYE COMPOSITION

[75] Inventors: Masaoki Takahashi, Tokyo; Michio Fumishi, Fukuyama, both of Japan

[73] Assignee: Nippon Kayaku Co., Ltd., Tokyo, Japan

[21] Appl. No.: 699,501

[22] Filed: Jun. 24, 1976

Related U.S. Application Data

[63] Continuation of Ser. No. 424,699, Dec. 14, 1973, abandoned.

[30] Foreign Application Priority Data

Dec. 16, 1972 Japan .................. 47/126522

[51] Int. Cl.$^2$ ............................. C09B 67/00
[52] U.S. Cl. ............................. 8/83; 8/89 R
[58] Field of Search .......... 8/83, 89, 173, 174, 8/177, 179

[56] References Cited

U.S. PATENT DOCUMENTS

| | | | |
|---|---|---|---|
| 2,734,793 | 2/1956 | Marnon et al. | 8/83 |
| 3,062,609 | 11/1962 | Abel | 8/83 |
| 3,094,515 | 6/1963 | Keirstead et al. | 8/83 |
| 3,728,078 | 4/1973 | Freshwater et al. | 8/174 |
| 3,765,835 | 10/1973 | Clarke et al. | 8/89 |
| 3,843,322 | 10/1974 | Streck | 8/174 |

OTHER PUBLICATIONS

Schwartz et al., Surface Act. Agents & Detergents, vol. II, (1958), Interscience Publ. Inc., p. 332.

*Primary Examiner*—William E. Schulz
*Attorney, Agent, or Firm*—Russell & Nields

[57] ABSTRACT

Basic dye compositions suitable for dyeing acid modified polyester and polyacrylonitrile fibrous articles comprise one or more finely dispersed, difficultly soluble dye complex salts composed of one or more water-soluble basic dyes and one or more dispersants capable of being ionically bonded to said basic dye. Appropriate anionic dispersants include a naphthalenesulfonic acid-formaldehyde condensate, a methylnaphthalenesulfonic acid-formaldehyde condensate, lignin sulfonic acid, and an alkyl sulfate.

5 Claims, No Drawings

BASIC DYE COMPOSITION

This is a continuation of application Ser. No. 424,699, filed Dec. 14, 1973, and now abandoned.

BACKGROUND OF THE INVENTION

Basic dyes have heretofore been marketed and used in the form of powder or crystals, and in some cases they are incorporated with appropriate solid diluents or assistants.

It has been pointed out that these dye powders have several undesirable defects. For instance, water-soluble powdery dyes having high tinting strength are considerably scattered on packing, weighing, pouring or shaking and cause contamination, irritation and coloration. Further, if they are not stored in good condition, they are coagulated into very difficultly soluble agglomerates by moisture and heat.

As a means for overcoming these problems, there is known a process for dyeing anionic polymeric fibers with use of a finely dispersed complex compound of a basic dye with a composite poly-acid selected from the group consisting of phosphotungstic acid, phosphomolybdic acid, silicotungstic acid, silicomolybdic acid and silicotungstomolybdic acid (see Japanese Patent Publication No. 19369/67).

In this process, it is necessary to employ molybdenum and tungsten which are more expensive than the starting materials to be used for formation of dye complex salts of this invention. Further, waste water recovered from the dyeing step contains salts of these composite poly-acids and hence, problems are involved in the treatment of such waste water. In contrast, in this invention, a cheap commercial dispersant can be employed, and since salts of such heavy metals as molybdenum and tungsten are not contained in the resultant waste water, the dispersant of the invention causes little trouble. Further, in this invention, a very good manufacturing efficiency can be attained because preparation of the dye complex salt can be conducted simultaneously with dispersion of the dye.

German Patent Application Laid-Open Specification No. 1,921,277 discloses a process for preparing a dye composition by finely dispersing a complex composed of a specific aromatic sulfonic acid and a basic dye. If an aromatic sulfonic acid is employed as an anion, a large amount of water should be used in the complex-forming reaction and a filtration step should be provided before the dispersing step. In short, an additional step should be conducted. Further, this process is defective in that the yield of the dye complex is low. Moreover, when the aromatic sulfonic acid is left in waste water from the step of dyeing anionic polymeric fibers, COD and BOD values are decreased. In contrast, the anionic dispersant to be used in this invention has none of these defects but exhibits good properties, and therefore, this invention brings about great industrial advantages.

DETAILED DESCRIPTION OF THE INVENTION

As pointed out above, the basic dye composition of this invention comprises a difficulty soluble complex salt of the water-soluble basic dye and the anionic dispersant in which cations of the dye are relatively tightly bonded to anions of the anionic dispersant, and therefore, dissociation of ions is not caused to occur at ordinary temperatures, though this undesirable phenomenon is inevitably observed in conventional basic dyes.

Accordingly, unlike conventional powdery or liquid basic dyes, the basic dye composition of this invention does not cause contamination or coloration of human bodies, various vessels and the like. Furthermore, the properties of the basic dye composition of this invention are hardly changed with lapse of time, because it is composed of a relatively stable complex salt. These are characteristics of the basic dye composition of this invention.

Any dye having basicity sufficient to form the difficultly soluble complex salt with the anionic dispersant can be used as the starting material for the dye composition of this invention. Accordingly, basic dyes to be used in this invention include a variety of dyes differing in chemical form. Some of them are ordinarily called cationic dyes, and basic dyes acting as a cationic chromatic group in an acidic aqueous medium are also included. As basic dyes suitable for formation of difficultly soluble dye complex salts, there can be mentioned, for example, di- and tri- arylmethane dyes, pyronine dyes, Rhodamine dyes, acridine dyes, Safranine dyes, oxazine dyes, quinoline dyes, thiazole dyes, basic azo dyes, basic azomethine dyes, basic polymethine dyes, basic azopolymethine dyes, basic anthraquinone dyes, basic quinophthaline dyes, basic phthalocyanine dyes, and the like.

These basic dyes can be used singly, and mixtures of two or more of them in appropriate proportions can also be used.

Preferable examples of the anionic dispersant to be used in this invention are lignin sulfonic acid, condensates of formaldehyde with 1- or 2- naphthalenesulfonic acid or with methylnaphthalenesulfonic acid, alkyl sulfates, and alkali metal, alkaline earth metal, ammonium and aluminum salts thereof.

Lignin sulfonic acid has the following basic structure

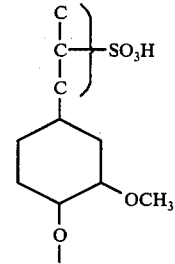

and it has one sulfonic acid group per two benzene nuclei. It is usually recovered from waste water obtained at the pulp-preparing step and is not a single compound but a mixture having a molecular weight of several hundreds to several millions. It is a macromolecular electrolyte that is dissociated in water. It also has properties as a surface active agent.

Among suitable alkyl sulfates there can be mentioned, for example, sodium lauryl sulfate and ammonium lauryl sulfate, etc.

Such anionic dispersant is employed in an amount of 1 to 15 per part of the water-soluble basic dye. These dispersants can be used singly, or two or more of them can be used in combination.

The basic dye composition of this invention is prepared by bonding the water-soluble basic dye ionically to the anionic dispersant to form a difficultly soluble dye complex salt and then dispersing the complex salt with the anionic dispersant. In practice, it is preferred to prepare the basic dye composition according to the following methods:

(1) The water-soluble basic dye is dissolved or suspended in water and the anionic dispersant is mixed with the solution to form the difficultly soluble dye complex salt, which is then dispersed with the excess of the anionic dispersant not participating in the reaction or a fresh supply of the dispersant by mixing and agitation.

(2) The water-soluble basic dye is dissolved or suspended in water and the anionic dispersant is mixed with the solution to form the difficultly soluble dye complex salt, which is then dispersed in the state dissolved in water or in the form of an aqueous slurry with the excess of the dispersant not participating in the reaction or a fresh supply of the dispersant by employing known mechanical dispersing means such as a colloid mill or ball mill or known dispersing techniques such as grinding or agitation together with sand.

(3) The water-soluble basic dye is dissolved or suspended in water and the anionic dispersant is mixed with the solution to form the difficultly soluble dye complex salt. The complex salt is dispersed with the excess of the dispersant not participating in the reaction or a fresh supply of the dispersant by mixing and agitation and in order to disperse it more sufficiently, known conventional dispersing techniques such as mentioned in (2) above are employed.

The composition thus obtained is dried to powder or made pasty, and it is marketed in the powdery or pasty form. At this step, it is possible to add dextrin to the composition as an extender or dyeing assistant.

As is disclosed in Color Index, 2nd edition, Vol. 1, page 1617, it is known that basic dyes are precipitated as water-insoluble pigments upon contact with a composite poly-acid such as phosphomolybdic acid. Further, as is taught by German Patent Application Laid-Open Specification No. 1,921,277 basic dyes react with a specific aromatic sulfonic acid to form a difficultly soluble dye salt. If these dye-acid complex compounds and difficultly soluble aromatic sulfonic acid-dye salts are dispersed with an anionic dispersant and are used for dyeing anionic acid-modified polymeric fibers such as acid-modified polyacrylonitrile fibers and acid-modified polyester fibers, linkages between the basic dye and the poly-acid or aromatic sulfonic acid are cleft and the basic dyes are quantitatively formed on the anionic polymeric fibers. The released composite poly-acid moiety or aromatic sulfonic acid moiety is removed in the state contained in the used dye bath or in a washing liquor used in the finishing treatment.

In the basic dye composition of this invention, a basic dye is ionically bonded to the anionic dispersant to form a substantially difficultly soluble complex salt. This complex salt is finely dispersed and with increase of temperature, it is gradually decomposed and only the basic dye is selectively absorbed on fibers to give a dyeing excellent in levelling property. Therefore, use of a levelling agent, that is customarily employed in this field, is not indispensable.

Since the basic dye composition of this invention consists substantially of the already-formed complex, it is possible to conduct single bath dyeing by employing it in combination with a dye of another type that cannot be used in combination with an ordinary basic dye because of a tendency to form the complex therewith, such as an acid dye, a disperse dye and a direct dye. Further, the dye composition of this invention is very stable against change of pH and hence, the dyeing can be performed under neutral conditions. These are great advantages of the basic dye composition of this invention.

In the use of ordinary cationic dyes for printing, in order to dissolve them it is necessary to add a dye-solubilizing agent to them and conduct heating at a high temperature. Further, even if they are once dissolved, crystals are readily precipitated by cooling or upon contact with a paste, and therefore, there is a danger that specks are formed. In the case of the dye composition of this invention, there was no danger of formation of such specks. Moreover, in the case of ordinary cationic dyes, an undercloth is readily contaminated at the printing step and this contamination cannot readily be removed, resulting in various operational troubles. However, the dye composition of this invention hardly caused such contamination.

This invention will now be described in more detail by reference to the following Examples, in which the terms "parts" and "%" are on the basis of weight unless otherwise indicated. It must be noted that the scope of this invention is by no means limited by these Examples.

EXAMPLE 1

33 parts of a basic yellow dye, C. I. Basic Yellow 11 (C.I. No. 48055) was added to 400 parts of water, and the mixture was agitated sufficiently. Then 66 parts of a dispersant (a sodium salt of a condensate of formaldehyde with 2-naphthalenesulfonic acid) was gradually added to the dye solution, whereby a difficultly soluble dye complex was formed and was mixed and agitated and then this complex was finely dispersed gradually. The resulting fine dispersion was spray-dried according to customary procedures to obtain 100 parts of a composition of the above yellow dye.

In this Example, the dye complex could be dispersed advantageously by the combined use of the above means and known mechanical dispersing means.

EXAMPLE 2

26 parts of a basic orange dye, C. I. Basic Orange 21 (C. I. No. 48035) was added to 350 parts of water, and the mixture was agitated sufficiently. Then, 2 parts of anhydrous sodium carbonate was added to the solution to make it neutral. When 74 parts of the same dispersant as used in Example 1 was added to the solution, a difficultly soluble dye complex salt was precipitated. Then, the complex salt was finely dispersed by grinding it sufficiently in a ball mill and drying it to obtain 100 parts of a composition of the above orange dye.

EXAMPLE 3

27 parts of a yellow dye represented by the following formula

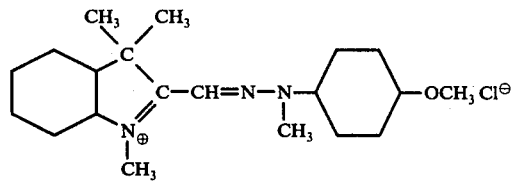

was added and dissolved into 300 parts of water. When 67.5 parts of the same dispersant as used in Example 1 was added to the solution, a difficultly soluble dye salt was precipitated and a part of the salt was finely dispersed. In order to disperse the complex salt sufficiently, it was ground in the presence of sand at 45° to 50° C. Then, 5.5 parts of dextrin was added to it and the mixture was dried to obtain 100 parts of a composition of the above yellow dye, which exhibited a tinting strength comparable to that of 100 parts of a commercially available product of the above yellow dye.

EXAMPLE 4

30 parts of a red dye represented by the following formula

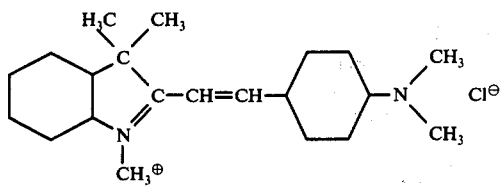

was added to 400 parts of water, and the mixture was agitated sufficiently. When 20 parts of a dispersant (a sodium salt of lignin sulfonic acid) was added to the solution, a dye complex salt was precipitated. Then, 45 parts of the same dispersant as used in Example 1 was added and the mixture was sufficiently ground in a ball mill, dried and pulverized to obtain a dye composition.

Formation of dye complex salts and composition thereof were conducted in the same manner as described above with use of basic dyes and anionic dispersants to obtain dye compositions indicated in Table 1.

Table 1

| Basic Dye | Dispersant |
|---|---|
| 1. (structure) | sodium salt of 2-naphthalene-sulfonic acid-formaldehyde condensate |
| 2. (structure) | sodium salt of 2-naphthalene-sulfonic acid-formaldehyde condensate |
| 3. (structure) | sodium salt of 2-naphthalene-sulfonic acid-formaldehyde condensate |
| 4. (structure) | sodium salt of 2-naphthalene-sulfonic acid-formaldehyde condensate |
| 5. (structure) | sodium salt of lignin sulfonic acid |
| 6. (structure) | sodium salt of 2-naphthalenesulfonic acid-formaldehyde condensate |

Table 1-continued

| Basic Dye | Dispersant |
|---|---|
| 7. 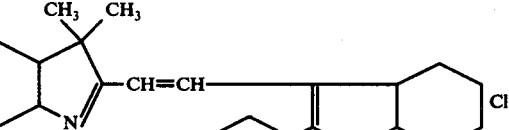 | sodium salt of 2-naphthalenesulfonic acid-formaldehyde condensate |
| 8. 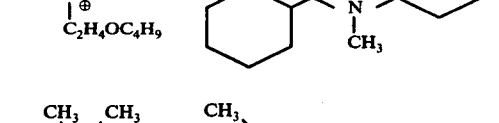 | sodium salt of 2-naphthalenesulfonic acid-formaldehyde condensate |

EXAMPLE 5

35 parts of a yellow dye represented by the following formula

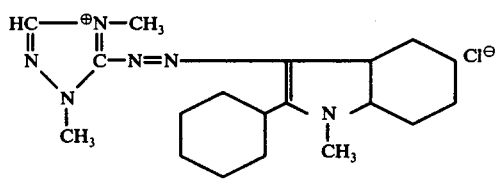

was added to 400 parts of water, and the mixture was agitated sufficiently. When 65 parts of the same dispersant as used in Example 1 was gradually added to the solution, a dye complex salt was precipitated. Then, the reaction mixture was sufficiently ground in a ball mill, dried and pulverized to obtain 100 parts of a dye composition.

EXAMPLE 6

30 parts of a red dye represented by the following formula

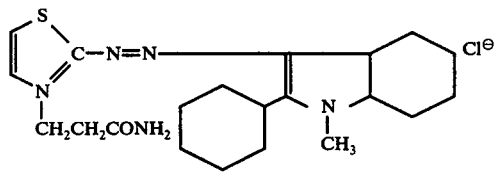

was added to 350 parts of water, and the mixture was sufficiently agitated. When 70 parts of the same dispersant as used in Example 1 was added to the solution, a dye complex salt was precipitated. The reaction mixture was sufficiently ground, dried and pulverized to obtain 100 parts of a dye composition.

EXAMPLE 7

40 parts of a red dye represented by the following formula

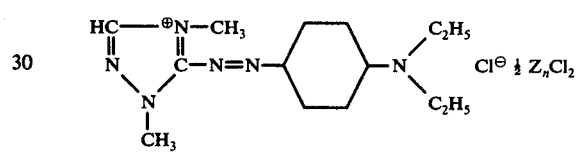

was added to 400 parts of water, and the mixture was sufficiently agitated. Then, 2.5 parts of anhydrous sodium carbonate was added to the solution to adjust the pH to a neutral value. Then, 60 parts of the same dispersant as used in Example 1 was added to the solution and the precipitated dye complex salt was sufficiently ground. The fine aqueous dispersion of the dye complex salt was spray dried to obtain 100 parts of a dye composition.

EXAMPLE 8

17 parts of a blue dye represented by the following formula

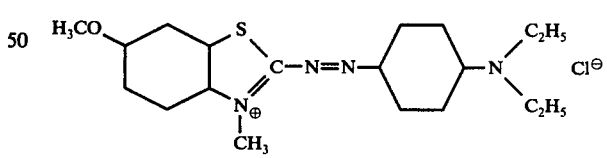

was added to 300 parts of water and dissolved therein. When 44.2 parts of the same dispersant as used in Example 1 was gradually added to the solution, a difficultly soluble dye complex salt thus formed was precipitated. After completion of the addition of the dispersant, the reaction mixture was sufficiently ground in a ball mill. Then, 38.8 parts of dextrin was added and the fine aqueous dispersion of the dye complex salt was spray dried to obtain 100 parts of a dye composition.

EXAMPLE 9

18 parts of a blue dye represented by the following formula

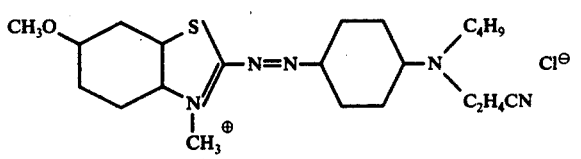

was added and dissolved into 300 parts of water. When 40 parts of the same dispersant as used in Example 4 (a sodium salt of lignin sulfonic acid) was added to the solution, a dye complex salt was precipitated and gradually dispersed finely. A ball mill was employed to disperse the complex salt sufficiently. The resulting liquid dispersion of the dye complex was incorporated with 42 parts of sodium sulfate, and the mixture was dried and pulverized to obtain 100 parts of a dye composition.

EXAMPLE 10

25 parts of a blue dye represented by the following formula was added to 400 parts of water and agitated sufficiently. Then, 65 parts of the same dispersant as employed in Example 1 was gradually added to the solution, and a dye complex salt thus formed was finely dispersed by means of a ball mill. Then, 10 parts of dextrin was added to the dispersed complex salt, and the mixture was dried to obtain 100 parts of a dye composition.

With use of basic dyes and anionic dispersants indicated in Table 2, formation of dye complex salts and grinding thereof were conducted in the same manner as described above to obtain compositions of dyes indicated in Table 2.

Table 2

| Basic Dye | Dispersant |
|---|---|
| 1. [structure] | sodium salt of 2-naphthalenesulfonic acid-formaldehyde condensate |
| 2. [structure] | sodium salt of methylnaphthalenesulfonic acid-formaldehyde condensate |
| 3. [structure] | sodium salt of methylnaphthalenesulfonic acid-formaldehyde condensate |
| 4. [structure] | sodium salt of 2-naphthalenesulfonic acid-formaldehyde condensate |
| 5. [structure] | sodium salt of 2-naphthalenesulfonic acid-formaldehyde condensate |
| 6. [structure] | sodium salt of lignin sulfonic acid and sodium salt of 2-naphthalenesulfonic acid-formaldehyde condensate |

Table 2-continued

| Basic Dye | Dispersant |
|---|---|
| 7. 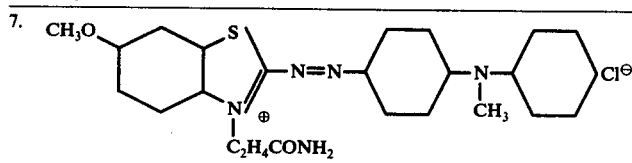 | sodium salt of 2-naphthalenesulfonic acid-formaldehyde condensate |

EXAMPLE 11

25 parts of a red dye represented by the following formula

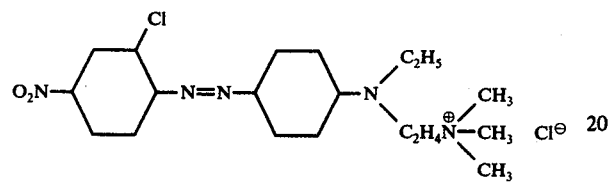

was added to 400 parts of water and the mixture was agitated sufficiently. Then, 60 parts of the same dispersant as used in Example 1 was gradually added to the solution, and a dye complex salt thus formed was finely ground by a ball mill, incorporated with 15 parts of dextrin and dried to obtain 100 parts of a composition of the above dye, which exhibited a tinting strength comparable to that of 100 parts of a commercially available product of the above dye.

EXAMPLE 12

35 parts of a yellow dye represented by the following formula

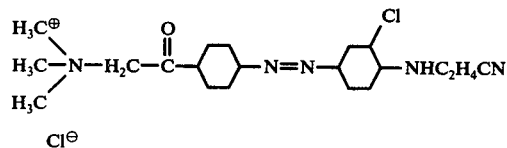

was added to 400 parts of water and the mixture was sufficiently agitated. Then, 65 parts of the same dispersant as used in Example 1 was gradually added to the solution, and the resulting dye complex salt was ground in a ball mill and dried to obtain 100 parts of a dye composition.

EXAMPLE 13

22 parts of a blue dye represented by the following formula

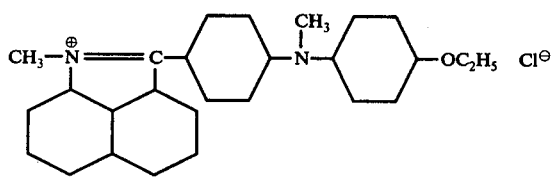

was added to 350 parts of water, and the mixture was sufficiently agitated. Then, 55 parts of the same dispersant as used in Example 1 was gradually added to the solution, and the resulting dye complex salt was sufficiently ground, incorporated with 23 parts of dextrin and dried to obtain 100 parts of a composition of the above dye.

EXAMPLE 14

28 parts of a blue dye represented by the following formula

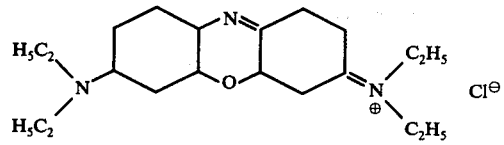

was added to 300 parts of water, and the mixture was sufficiently agitated. Then, 72 parts of the same dispersant as used in Example 1 was gradually added to the solution, and the resulting dye complex salt was ground by a ball mill. The resulting substantially liquid dispersion was dried and pulverized to obtain a composition of the above dye.

The above procedures were repeated by employing instead of the above blue dye a dye represented by the following formula

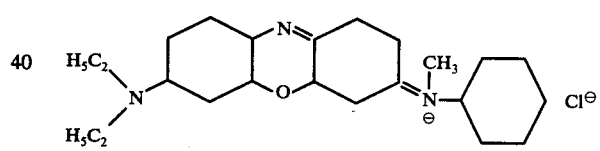

and a similar composition was obtained.

EXAMPLE 15

33 parts of a green dye represented by the following formula

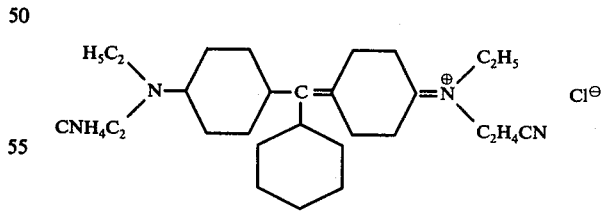

was added to 350 parts of water, and the mixture was sufficiently agitated. Then, 67 parts of the same dispersant as used in Example 1 was gradually added to the solution, and the resulting dye complex salt was sufficiently ground in a ball mill, dried and pulverized to obtain 100 parts of a dye composition.

EXAMPLE 16

10 parts each of dyes represented by the following formulae

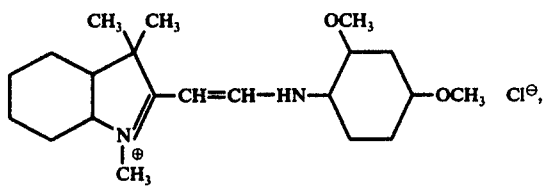

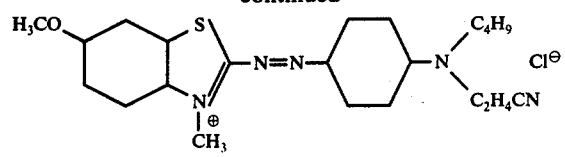

-continued

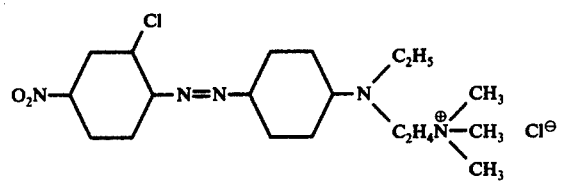

and, were added to 300 parts of water and the mixture was sufficiently agitated. Then, 70 parts of the same dispersant as employed in Example 1 was gradually added to the solution, and the resulting dye complex salt was sufficiently ground in a ball mill and dried to obtain 100 parts of a composition of a mixture of the dyes indicated above. This mixture was quite homogeneous.

In the same manner as described above, basic dyes were reacted with dispersants and resulting dye complex salts were ground and finely pulverized to obtain compositions of dyes indicated in Table 3.

Table 3

| | Basic Dye | Dispersant |
|---|---|---|
| 1 | (CH₃)₃N⁺CH₂CO—⟨⟩—N=N—C(=C(CH₃)—NH)  Cl⁻ | sodium salt of 2-naphthalenesulfonic acid-formaldehyde condensate |
| 2 | (CH₃)₂N—⟨⟩—C(—⟨⟩)=⟨⟩=N⁺(CH₃)₂  Cl⁻ | sodium salt of 2-naphthalenesulfonic acid-formaldehyde condensate |
| 3 | (C₂H₃)₂N—⟨⟩—CH=C—C(=O)—O... C(=N⁺(CH₃))(N(CH₃))  Cl⁻ | sodium salt of 2-naphthalenesulfonic acid-formaldehyde condensate |
| 4 | (C₂H₃)₂N—⟨O⟩—=N⁺(C₂H₅)₂ , —COOC₂H₅  Cl⁻ | sodium salt of 2-naphthalenesulfonic acid-formaldehyde condensate |
| 5 | (C₂H₃)₂N⁺=⟨⟩—N=⟨⟩—CH₃, N=N—⟨⟩—N(CH₃)(C₂H₄CN)  Cl⁻ | sodium salt of 2-naphthalenesulfonic acid-formaldehyde condensate |
| 6 | (CH₃)₂N—⟨S,N⟩—N⁺(CH₃)₂  Cl⁻ | sodium salt of 2-naphthalenesulfonic acid-formaldehyde condensate |

Table 3-continued

| Basic Dye | Dispersant |
|---|---|
| 7. (anthraquinone derivative with NH₂ and NH-cyclohexyl-CH₂N(CH₃)₃⁺ Cl⁻ substituents) | sodium salt of 2-naphthalenesulfonic acid-formaldehyde condensate |

Example 17

25 parts of a yellow dye represented by the following formula

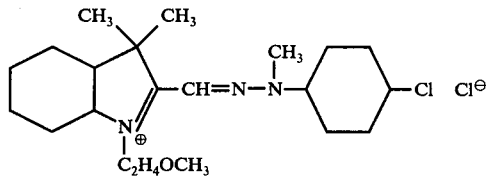

was added to 250 parts of water, and the mixture was sufficiently agitated. Then, 75 parts of a dispersant (highly pure product of sodium lauryl sulfate) was gradually added to the solution. The resulting difficulty soluble dye complex salt was gradually dispersed finely, and was sufficiently ground by a ball mill, dried and pulverized to obtain 100 parts of a dye composition.

In the same manner as described above, dye complex salts were prepared from basic dyes and anionic dispersants and ground to obtain compositions of dyes indicated in Table 4.

Table 4

| Basic Dye | Dispersant |
|---|---|
| 1. (triazine-azo dye structure with Cl⁻·1/2ZnCl₂) | sodium lauryl sulfate (highly pure product) |
| 2. (benzothiazolium-azo dye with CH₃O, C₂H₅, C₂H₄OH, Cl⁻) | sodium lauryl sulfate (highly pure product) |
| 3. (benzothiazolium-azo dye with C₂H₄OCH₃, CH₃O, CH₃, CH₂-cyclohexyl, Cl⁻) | sodium lauryl sulfate (highly pure product) |
| 4. (nitro-cyano-azo dye with C₂H₅, C₂H₄N⁺(CH₃)₃, Cl⁻) | sodium lauryl sulfate (highly pure product) and naphthalenesulfonic acid-formaldehyde condensate |
| 5. (pyridinium-azo dye with ZnCl₃⁻) | sodium lauryl sulfate (highly pure product) and naphthalenesulfonic acid-formaldehyde condensate |

EXAMPLE 18

(ordinary dyeing method)

2 parts of a basic red dye composition prepared in Example 6 was sufficiently mixed in 5000 parts of warm water containing 1 part of glacial acetic acid to form a dye bath. Then, 100 parts of a yearn of polyacrylonitrile fibers was immersed in said dye bath at 60° C. and the temperature of the dye bath was elevated to 98° to 100° C. over a period of 30 minutes. Dyeing was conducted at this temperature for 60 minutes, and the dyed yarn was washed with water.

A clear red dyeing was obtained. Contamination of a worker's body or the dyeing vessel was hardly observed.

EXAMPLE 19

(short time dyeing method)

4 parts of a basic yellow dye composition prepared in Example 5 was sufficiently mixed into 5000 parts of warm water containing 1 part of glacial acetic acid to form a dye bath. Then, 100 parts of a cloth of polyacrylonitrile fibers was immersed in the dye bath at 90° C. and the temperature of the dye bath was elevated to 100° C. over a period of 10 minutes. Dyeing was conducted at this temperature for 30 minutes, and the dyed cloth was then washed with water. A level yellow dyeing was obtained in a short time without employing a retarding agent. Accordingly, this method was very advantageous from the economical viewpoint.

EXAMPLE 20

(one bath dyeing of acrylic and wool mixed fibers)

1 part of a basic blue dye composition prepared in Example 14 was dispersed in 10 parts of water. Separately, 2 parts of Kayanol Milling Blue BW (acid dye manufactured by Nippon Kayaku K.K.) was dissolved in 20 parts of hot water. Both the solutions were added into 6000 parts of water containing 1 part of glacial acetic acid to form a dye bath. Then, 100 parts of a yarn of mixed spun fibers of acrylonitrile:wool (50:50) was immersed in the dye bath at 60° C. The temperature of the dye bath was elevated to 100° C. at a rate of 1° C. per minute, and dyeing was conducted at this temperature for 60 minutes. Then, the dye bath was gradually cooled. In the case of ordinary cationic dyes, if an expensive precipitation-preventing agent is not used, tarring is caused to occur and no level dyeing is obtained. However, in the case of the dye composition of this invention, a level dyeing was obtained without using such particular additive, and the dyeing operation could be performed very easily.

EXAMPLE 21

(dyeing of 65:35 mixed acrylic and rayon fibers)

1 part of a basic yellow dye composition obtained in Example 5 was dissolved in slightly warm water maintained at about 400° C. Separately, 1 part of Kayarus Supra Yellow RL (direct dye of high grade manufactured by Nippon Kayaku K.K.) was dissolved in hot water. Both the solutions were added to 4500 parts of pure water incorporated with 0.2 part of glacial acetic acid, and the resulting dye bath was heated to 70° C. Then, 12 parts of anhydrous sodium sulfate was added to the bath, and 120 parts of a yarn of acrylonitrile-rayon mixed spun fibers was thrown into the bath. The temperature of the dye bath was elevated to 100° C. over a period of about 30 minutes and at this temperature dyeing was conducted for 60 minutes. The dye bath was cooled to 60° C. and a fixing treatment was conducted according to customary procedures. A fast dyeing of a concentrated yellow color could easily be obtained.

In the case of ordinary cationic dyes, a good reproducibility cannot be obtained when the pH of a dye bath is 5 to 6 as in this Example. In contrast, the composition of this invention was very stable even at such a bath pH, and a variety of direct dyes could be used in combination.

EXAMPLE 22

(dyeing of 50:50 acrylonitrile-polyester mixed fibers)

1 part of a basic yellow dye composition prepared in Example 5 and 2 parts of Kayalon P-lyester Yellow YL-SE (C.I. Disperse Yellow 60 manufactured by Nippon Kayaku K.K.; disperse dye) were dispersed in slightly warm water, and the dispersion was diluted with 6000 parts of water. Then, 0.5 part of glacial acetic acid, 10 parts of dichlorobenzene and 1 part of sorbitan monolaurate were added to the bath and sufficiently mixed therein. Then, 100 parts of a yarn of acrylonitrile-polyester mixed spun fibers was immersed in the bath and the temperature of the dye bath was elevated to 100° C. from 60° C. at a rate of 1° C. per minute. Dyeing was conducted at this temperature for 60 minutes to obtain a fast dyeing of a clear lemon yellow color.

The dyes could easily be dissolved and no trouble occurred among the basic dye composition, disperse dye and carriers. Dyeing could be carried out stably without substantial contamination of the dyeing vessel.

EXAMPLE 23

(dyeing of 50:50 acrylonitrile-cotton mixed fiber yarn)

0.4 part of a basic blue dye composition prepared in Example 14, 1 part of Procion Brilliant Blue H-5G (C.I. Reactive Blue 25), 0.7 part of glacial acetic acid and 0.5 part of sodium acetate were dissolved and dispersed into 5000 parts of pure water. Then, 200 parts of a yarn of acrylic and cotton mixed fibers was immersed in the so-obtained dye bath, and the temperature of the dye bath was elevated to 100° C. from 70° C. over a period of 20 minutes. Dyeing was conducted at this temperature for 40 minutes. Then, the bath was gradually cooled to 90° C. and 250 parts of anhydrous sodium sulfate was added to the bath. Then, the temperature was further lowered and at 80° C. 700 parts of soda ash was added. The yarn was thus treated for 40 minutes and water soaping was carried out to obtain a fast dyeing of a clear turquoise blue color.

EXAMPLE 24

(continuous pad-steam dyeing of acryl fiber-tufted carpet) Material to be dyed:

| | |
|---|---|
| Vonnel-tufted carpet (substrate being cotton) | 10 parts |
| Pad bath composition: | |
| Dye (composition prepared in Example 3) | 10 parts |
| Starch paste | 2 parts |
| 50% tartaric acid | 10 parts |
| Water | 978 parts |

Dyeing Method:

Fibers immersed in the above pad bath for 1 to 2 seconds were squeezed by a special rubber mangle so that the weight of the fibers was 1.9 times the dry weight. Then, the fibers were treated for 10 minutes in a steamer at 100° C., and then, they were treated at 60° C. for 10 minutes in a washing tank containing 1000 parts of water incorporated with 2 parts of a non-ionic activating agent, thereby to obtain a dyeing of a clear orange-like yellow color.

In this dyeing method, the substrate cloth was hardly contaminated with the cationic dye and in view of the dye-absorbed state, it was found that the resulting dyeing was very excellent in levelness.

EXAMPLE 25

(printing)

A colour paste liquid mixture was prepared from 4 parts of a dye composition prepared in Example 4, 56 parts a carboxy methyl cellulose type thickener (diluted to 20% concentration and taking the form of a highly viscous liquid), 3 parts of tartaric acid, 4 parts of urea and 33 parts of water, and this colour paste was printed on a polyacrylonitrile cloth and the printed cloth was dried at room temperature. Then, the cloth was subjected to the steaming treatment at 100° C. for 30 minutes. The dyed cloth was washed with warm water and with water to obtain a printed cloth of a clear red color.

EXAMPLE 26

1 part of a raw powder of C.I. Basic Red 46 was insolubilized with 3 parts of sodium lauryl sulfate ($C_{12}H_{25}OSO_3Na$), and the mixture was blended and dispersed in a colloid mill and dried. Then, 4 parts of the so obtained dye powder was dispersed and dissolved in 1500 parts of warm water maintained at 40° C. and the pH was adjusted by addition of 1 part of glacial acetic acid. Then, 100 parts of a plain weave fabric of Dacron T-64 (basic dye-dyeable polyester) was immersed in the so obtained dye bath, and the temperature of the dye bath was gradually elevated to 120° C. over a period of 30 minutes. Dyeing was conducted at this temperature for 60 minutes and the temperature of the dye bath was lowered to obtain a dyeing of a concentrated red color. In this Example, a level dyeing could be obtained without use of an assistant, and although the dyeing exhibited a concentrated color, no dye was left after the dyeing operation and the waste water was colorless and transparent. In case the above dyeing procedures were repeated with use of ordinary water-soluble basic dyes, the dye absorption rate was extremely high at temperatures approximating 110° C. and it was difficult to obtain a level dyeing.

EXAMPLE 27

A mixture of 80 parts of C.I. Basic Orange 21, 170 parts of C.I. Basic Green 4 and 350 parts of C.I. Basic Red 18 was insolubilized with 1500 parts of sodium lauryl sulfate, and the insolubilized dye mixture was dispersed and dried. Then, 8 parts of the so obtained black dye was dispersed and dissolved in 4000 parts of water, and 1 part of Kayakalan Black TLB (acid dye manufactured by Nippon Kayaku K.K.) was added thereto, following which the pH was adjusted to 4 to 5 by addition of 1 part of glacial acetic acid. Then, 100 parts of a yarn of 70:30 acrylic and wool mixed fibers was immersed in the so obtained dye bath. The temperature of the bath was elevated from room temperature to 100° C. over a period of 30 to 40 minutes and dyeing was conducted for 90 minutes at this temperature. Both the acrylic and wool fibers were readily dyed simultaneously to obtain a level dyeing of a black color.

When 1 part of sodium polyoxyethylene lauryl sulfate $[C_{12}H_{25}O(CH_2CH_2O)_nSO_3Na]$ was added prior to the dissolution of said black dye and dyeing was conducted in the same manner, a level dyeing similar to the above was obtained.

In case commercially available products of the foregoing water-soluble basic dyes were employed without the insolubilizing treatment, the resulting dyeing had a much reduced concentration and the intended hue could not be obtained. Further, specks of the insoluble material were stuck to the dyed product and the fastness to abrasion was extremely poor.

In case the above composition was employed, however, formation of specks was not observed and the fastness to abrasion was very good.

(In this Example, all parts corresond to percent values based on the weight of commercially available water-soluble basic dyes used in the comparative run.)

EXAMPLE 28

0.9 part of a composition of C.I. Basic Red 29 and a naphthalenesulfonic acid-formaldehyde condensate, 0.5 part of glacial acetic acid, 0.1 part of crystalline sodium acetate and 0.9 part of polyoxyethylene nonylphenyl ether

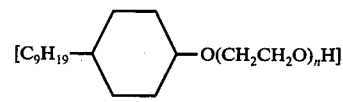

were dissolved in 1000 parts of water, and 20 parts of a highly bulky yarn of polyacrylic fibers having anionic groups was immersed in the so obtained dye bath, and the temperature of the dye bath was elevated to 98° to 100° C. over a period of 30 minutes. Dyeing was conducted at this temperature for 60 minutes. The dye bath was cooled and the dyed yarn was taken out of the bath. The optical density of the remaining liquid was measured by an automatic-recording photoelectric spectrometer, Model EPR-2 manufactured by Hitachi Seisakusho and it was found that the dye absorption was 96.7%.

In case the above procedures were repeated without addition of polyoxyethylene nonylphenyl ether, the dye absorption was 82.6%. A denser dyeing obtained when polyoxyethylene nonylphenyl ether was added.

EXAMPLE 29

0.3 part of a composition of C. I. Basic Blue 65 and a naphthalenesulfonic acid-formaldehyde condensate, 0.3 part of C. I. Acid Yellow 70, 0.5 part of glacial acetic acid and 0.3 part of polyoxyethylene sorbitan mono-oleate of the following structure

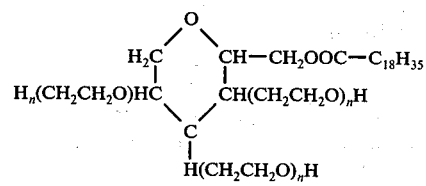

were added to water to form 1000 parts of a dye bath. Then, 20 parts of a mixed fabric of Cashmilon F (polyacrylonitrile fibers manufactured by Asahi Kasei) and wool (mixing ratio being 55:45) was immersed in the bath, and the temperature of the dye bath was elevated to 100° C. over a period of 30 minutes. Dyeing was conducted at this temperature for 60 minutes. The Casmilon F was dyed a clear blue color and wool was dyed a yellow color. Thus was obtained a dyeing excellent in the multi-color effect.

EXAMPLE 30

0.1 part of a composition of C.I. Basic Red 50 and a naphthalenesulfonic acid-formaldehyde condensate, 0.5 part of glacial acetic acid and 0.3 part of crystalline sodium sulfate were dissolved in water and 0.1 part of polyoxyethylene stearylamine of the following structure

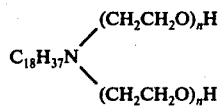

was added to the solution to obtain a dye bath. Then, a fabric of non-modified polyester fibers interwoven with stripes of polyacrylic fibers (mixing ration being 99:1) was immersed in the dye bath, and the temperature of the dye bath was elevated to 100° C. over a period of 40 minutes. Dyeing was conducted at this temperature for 60 minutes. The polyacrylic fibers were dyed a concentrated red color and the polyester fibers were left white. Thus was obtained a fabric having a red stripe pattern on the white background. Since contamination of the polyester fibers was extremely low, it was unnecessary to conduct soaping.

What is claimed is:

1. A basic dye composition consisting essentially of a finely dispersed difficultly soluble dye complex salt consisting essentially of one or more anionic dispersants which are selected from the group consisting of (a) a condensate of formaldehyde with naphthalenesulfonic acid, (b) a condensate of formaldehyde with methylnaphthalenesulfonic acid (c) Lignin sulfonic acid and (d) sodium and ammonium lauryl sulfate and one or more water-soluble basic dyes and optionally water, said composition having been prepared by a process consisting essentially of the step of dissolving or suspending 1 part of water-soluble basic dye in water, mixing 1 to 15 parts said anionic dispersant with the solution and optionally drying if the basic dye composition is intended to be powder.

2. A basic dye composition set forth in claim 1 wherein one of the anionic dispersants is a condensate of formaldehyde with naphthalenesulfonic acid.

3. A basic dye composition set forth in claim 1 wherein one of the anionic dispersants is a condensate of formaldehyde with methylnaphthalenesulfonic acid.

4. A basic dye composition set forth in claim 1 wherein one of the anionic dispersants is lignin sulfonic acid.

5. Process for the preparation of basic dye composition consisting essentially of the steps of dissolving or suspending one part of water-soluble basic dye in water and mixing 1 to 15 parts of one or more anionic dispersants which are selected from the group consisting of (a) a condensate of formaldehyde with naphthalenesulfonic acid, (b) a condensate of formaldehyde with methylnaphthalenesulfonic acid (c) Lignin sulfonic acid and (d) sodium and ammonium lauryl sulfate with the solution to form a difficultly soluble dye complex salt consisting essentially of said anionic dispersant, said water soluble basic dye and said water.

* * * * *